(12) United States Patent
Hiraishi et al.

(10) Patent No.: US 6,582,783 B2
(45) Date of Patent: Jun. 24, 2003

(54) LAMINATED FILMS

(75) Inventors: Masanori Hiraishi, Osaka (JP); Masanari Ohnishi, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 61 days.

(21) Appl. No.: 09/886,381

(22) Filed: Jun. 22, 2001

(65) Prior Publication Data

US 2002/0027626 A1 Mar. 7, 2002

(30) Foreign Application Priority Data

Jun. 22, 2000 (JP) ........................................ 2000-187912

(51) Int. Cl.$^7$ ............................................... C09K 19/00
(52) U.S. Cl. ........................... 428/1.1; 428/1.2; 428/1.6
(58) Field of Search .................................. 428/1.1–1.62

(56) References Cited

U.S. PATENT DOCUMENTS 6,361,838 B1 * 3/2002 Miyatake et al. .......... 428/1.31
6,416,910 B1 * 7/2002 Iimura et al. ................ 428/1.3

FOREIGN PATENT DOCUMENTS

| JP | 7261171 | 10/1995 |
| JP | 4314522 | 11/1995 |
| JP | 11142843 | 5/1999 |

* cited by examiner

*Primary Examiner*—Mark F. Huff
*Assistant Examiner*—Jennifer R. Sadula
(74) *Attorney, Agent, or Firm*—Birch, Stewart, Kolasch & Birch, LLP

(57) ABSTRACT

A transparent resin layers 12 and 13 are laminated on at least one side (in particular, both sides) of the light-scattering layer 11. The anisotropic light-scattering layer 11 comprises a continuous phase and a particulate dispersed phase 14 which have the different refraction indexes from each other, the mean aspect ratio of the particulate dispersed phase 14 is more than 1 and the longitudinal axis of the particulate dispersed phase is oriented in a direction. The laminated film 10 can be capable of diffusing incident light in its advanced direction and having a light-scattering characteristic over a range of $\theta=4$ to $30°$:

$$Fy(\theta)/Fx(\theta) > 5$$

wherein $Fx(\theta)$ represents the light-scattering characteristic in the direction of the major axis of the particulate dispersed phase and $Fy(\theta)$ represents the light-scattering characteristic in the direction normal to the major axis of the particulate dispersed phase. According to the laminated film, a uniform surface emission can be realized with close tolerances and the film can be steadily produced for a long term.

15 Claims, 4 Drawing Sheets

LAMINATED FILMS

FIELD OF THE INVENTION

The present invention relates to an anisotropic diffusing film which is useful for assuring a uniform light emission on a display device (a flat-type or surface display device), a method of producing the same, and a display device utilizing the film. More particularly, the invention relates to an anisotropic diffusing film which is useful for transmission type (mode) or reflection type (mode) liquid crystal display or projection television.

BACKGROUND OF THE INVENTION

Among surface display devices (illumination devices) such as a liquid crystal display device, there is known a backlight type (transmission type) display device comprising a fluorescent tube disposed behind of a liquid crystal display module. Also is known a reflection type display device comprising a light reflecting layer formed on the back of a liquid crystal display module so that the light incident on the front surface is reflected by the light reflecting layer. In such display devices, a diffuser or diffusing film is frequently used to diffuse the light from the fluorescent tube or the reflected light from the light reflecting layer to assure a uniform luminance. As the diffusing film, a diffusing film comprising a polycarbonate or polyester base film which is transparent and highly heat-resistant, and containing refractive microfine particles (resin beads) or light-transmitting inorganic microfine particles incorporated therein by coating or containing is generally employed.

Recent years have seen an increasing demand for such diffusing films as the diffusing film for the backlight component of the backlight type liquid crystal display device. The diffusing film for backlight use is usually interposed between the backlight (cold cathode tube) and the liquid crystal layer to homogenize the light emitted from the cold cathode tube. However, when the diffusing of light is too large, no sufficient emission luminance can be obtained. Therefore, an optical element such as a prismatic lens is interposed between the diffusing film (diffuser) and the liquid crystal layer to thereby refract the diffused light so that the light will be incident perpendicularly on the liquid crystal display surface, thus upholding the luminance.

Figure 4:
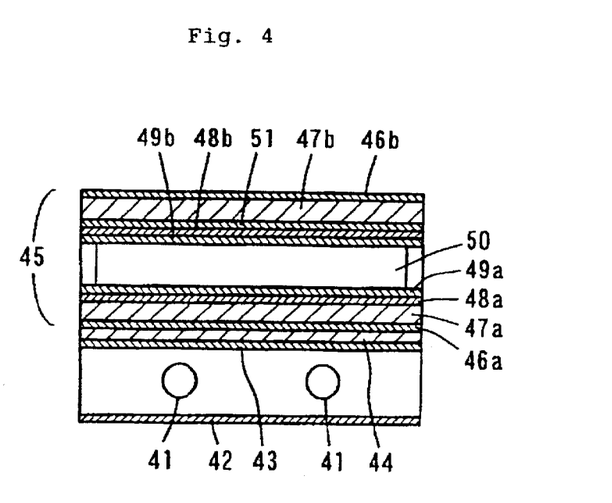
FIG. 4 is a schematic cross-section view of a transmission type liquid crystal display device.

As the surface display device [i.e., a display device the image display area of which is a flat surface (a flat type display device)], the device illustrated in FIG. 4 is known. This device comprises a surface display module 45 (particularly a transmission type liquid crystal display module) and at least one fluorescent discharge tube (cold cathode tube) 41 which is adapted to illuminate the module from its back side. Disposed on the back side of the fluorescent discharged tube 41 is a reflector 42 for reflecting the light advancing toward the back side. Moreover a diffuser 43 for diffusing light to uniformly illuminate the module 45 is interposed between the fluorescent discharged tube 41 and the module 45 and a prism sheet 44 is disposed on the module side of the diffuser 43. This surface display module 45, in the case of a liquid crystal display module, comprises a first polarizing film 46a, a first glass substrate 47a, a first electrode 48a on the glass substrate, a first alignment layer 49a on the electrode, a liquid crystal layer 50, a second alignment layer 49b, a second electrode 48b, a color filter 51, a second glass substrate 47b, and a second polarizing film 46b as successively built up (laminated) in the order mentioned. In such a display device, the display module can be directly illuminated from the back side by the built-in fluorescent tube (cold cathode tube) 41. However, an uneven emission (luminance) distribution in the direction normal to the longitudinal axis of the fluorescent tube is inevitable, causing a streak pattern to appear, although the emission distribution in the longitudinal direction of the fluorescent tube is uniform.

Figure 5:
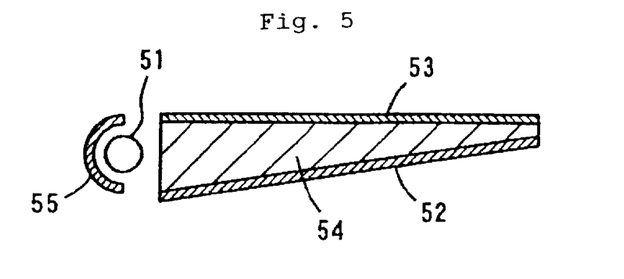
FIG. 5 is a schematic cross-section view of a backlight component for use in a transmission type liquid crystal display device.

Further, there is known the device constructed by using the backlight unit including a light guide illustrated in FIG. 5 as the backlight system of the surface display device of FIG. 4. This backlight unit has a fluorescent tube (cold cathode tube) 51 and a reflector member 55 disposed in parallel with the fluorescent tube, with a light guide 54 having a diffuser 53 at top and a reflector 52 at bottom being disposed in the direction of light emission from the fluorescent tube. The lower part of the light guide 54 is inclined so that the light from the fluorescent tube can be reflected in an upward direction. The light emerging in the direction of the top of the light guide 54 is diffused by the diffuser 53 and incident on the surface display module (not shown) constructed (laminated) on the diffuser 53.

Figure 6:
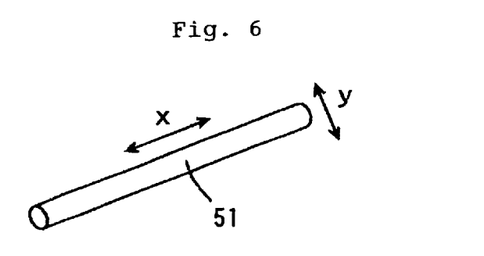
FIG. 6 is a schematic perspective view of a light projector means.
Figure 7:
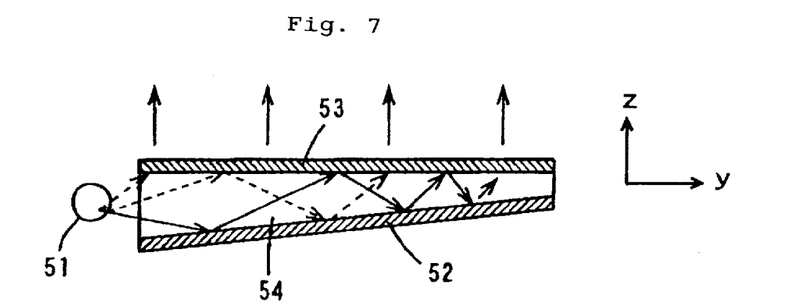
FIG. 7 is a schematic cross-section view illustrating the emission distribution of the backlight component shown in FIG. 5.

When such a backlight unit is used, in contrast to the backlight unit or component of FIG. 4, the emission distribution may appear uniform over the surface but a detailed observation of the emission distribution reveals that the distribution is still not as uniform as desired. Thus, as shown in FIGS. 6 and 7, the emission distribution (luminance distribution) in the longitudinal (axial) direction (x-direction) of the fluorescent tube (cold cathode tube) 51 is small as it is the case in the device of FIG. 4 but the emission from the fluorescent tube (cold cathode tube) in the y-direction which is normal to the x-direction is repeatedly reflected by the reflector 52 and advances in the z-direction (the direction in which the liquid crystal display module is disposed) which is perpendicular to the xy plane so that the emission distribution (luminance distribution) in the y-direction is distorted (in a zigzag pattern), thus failing to assure sufficient uniformity.

Thus, in the usual backlight type display device, the emission distribution (luminance distribution) in the direction normal to the longitudinal direction (X-direction) of the fluorescent tube is not uniform and a streak-like directionality (linear dark areas) is produced in the emission distribution. Moreover, even when a diffusing film containing microfine particles is used, it is inevitable from its isotropy of light diffusing that the luminance in a certain direction (the direction of disposition of the fluorescent tube, the streaking direction, X-direction) is unduly lowered.

Japanese Patent Application Laid-Open No. 142843/1999 (JP-A-11-142843) describes a technology such that a dot pattern for scattering light is formed in rows perpendicular to the light source on the surface of the light guide. However, even with this contrivance, linear dark areas (a streak pattern) are observed in the direction of disposition of the fluorescent tube.

Japanese Patent Application Laid-Open No. 261171/1995 (JP-A-7-261171) describes a reflection type liquid crystal display device comprising a pair of glass substrates, an electrode formed on each of the opposed surfaces of the glass substrates, a liquid crystal sealed interposed between the electrodes, and a polarizing film formed on (laminated) the outer surface of the external one of the pair of glass electrodes, with a light-scattering layer composed of two or more kinds of resins differing from each other in the index of refraction and forming mutually segregated (separated) phases being disposed on the surface of the polarizing film.

In this literature, it is mentioned that the polarizing film is coated or printed with a mixture of two or more kinds of resins in a solvent to form the light-scattering layer.

Figure 8:
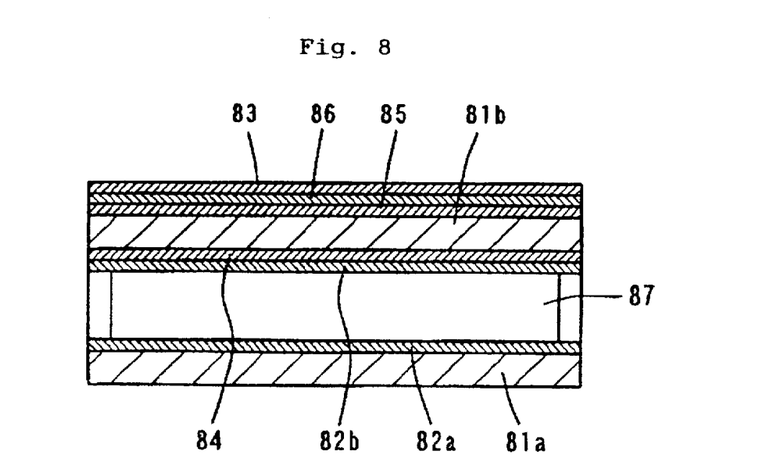
FIG. 8 is a schematic cross-section view of a reflection type liquid crystal display device.

Furthermore, as a reflection type liquid crystal display device (or a reflection type liquid crystal module), the device (or module) illustrated in FIG. 8 is also known. This reflection type display module comprises a pair of glass substrates 81a, 81b, a pair of electrodes 82a, 82b formed on the opposed surfaces of the glass substrates, and a liquid crystal 87 interposed between the electrodes forming the pair, the electrode 82a formed on the glass substrate 81a on the back side constituting light-reflective pixel electrodes and a color filer 84 being interposed between the glass substrate 81b on the front side and the electrode 82b. In addition, a phase difference layer 86 is constructed (laminated) through a polarizing layer 85 on the front surface of the glass substrate 81b on the front side. In this reflection type liquid crystal display module, a diffuser 83 is laminated on the front surface (the front surface of the phase difference layer 86) to constitute a reflection type liquid crystal display device. Since, in the reflection type liquid crystal display device, one polarizing layer 85 is situated on the front side of the liquid crystal cell, unlike in the transmission type display device having a built-in lamp (the backlight type liquid crystal display device), the incident light which is incident on the front surface of the device (external light) is diffused by the diffuser 83 and enters into the liquid crystal cell and then is reflected by the reflective electrode (reflector) 82a within the liquid crystal cell and diffused by the diffuser 83. Therefore, the data or image displayed on the display module can be visually recognized from any angle without loss of luminance without the provision of a lamp (light) but utilizing external light.

In the reflection type liquid crystal display device, however, if the light diffusing power or ability of the diffuser is too great, the incident light and the reflected light are randomly reflected in a large measure by the diffuser so that the clarity of displayed data is sometimes sacrificed.

Meanwhile, Japanese Patent Application Laid-Open No. 314522/1992 (JP-A-4-314522) describes an anisotropic light-scattering material comprising a transparent matrix and a (particulate) transparent substance which is morphologically anisotropic and differing in the index of refraction from the transparent matrix as uniformly dispersed in the matrix in a positional relation shifted in an orderly and mutually parallel manner. In this literature, it is disclosed that an aspect ratio of the anisotropic form is preferably 15 to 30, and the dimension of the minor axis is 1 to 2 $\mu$m. Concretely, a low-density polyethylene having a low melting point is employed as the transparent matrix resin, and a polystyrene or a styrene-acrylonitrile copolymer which has a higher melting point than that of the above polyethylene is employed as the transparent substance. The anisotropic light-scattering material is produced by extruding a composition obtained by melt-kneading the transparent matrix resin and the transparent substance and cooling the molten resin which is extruded in the form of a sheet under a large draft applied in the direction of extrusion. The anisotropic light-scattering material is employed as a lenticular lens for the projection television screen.

However, as described in FIGS. 3 to 6 of the literature, when $Fy(\theta)$ represents a light-scattering characteristic (intensity) at a scattering angle $\theta$ of a scattering light on a plane which is perpendicular to the major axis of the dispersed particle and $Fx(\theta)$ represents a light-scattering characteristic (intensity) at a scattering angle $\theta$ of a scattering light on a plane which is parallel to the major axis of the dispersed particle, the ratio of $Fy(\theta)$ to $Fx(\theta)$ at the scattering angle $\theta=4°$ is $Fy(4°)/Fx(4°)$=about 2. Thus, anisotropy of the anisotropic light-scattering material is still inadequate. Further, the clarity of displayed data is insufficient.

Further, in the process for producing a sheet described in the literature, a sheet can not be steadily produced for a long time since the transparent material in anisotropic form forming the dispersed phase is attached to a wall of a die used in extruding, or to a roll used in drawing. A molten resin which is extruded in the form of a sheet is cooled with stretching and drawing so that a sheet width is remarkably reduced and thicknesses at both edges of the sheet tend to be thick after stretching, thus the useful rate (yield) of the sheet is deteriorated.

The anisotropic light-scattering material (sheet) is wound in the form of a roll or cut in suitable size and laminated for preservation. Further, as to the supply form for using as a part, about one hundred of the cut sheets are laminated. However, it is possible that the wound or laminated sheets stick to each other (blocking) in case of standing for a long term or under the circumstances of high temperature and humidity.

The anisotropic scattering material is sometimes bent slightly when incorporated in a display device. However, attention should be given to handling of the anisotropic light-scattering material since the material tends to receive a fold and a flaw thereon by slightly bending.

Though the display device is required to have high heat resistance in order to use under a wide variety of conditions, the anisotropic scattering material is inadequate in heat resistance since it contains a dispersing agent which begins to soften at a relatively low temperature.

SUMMARY OF THE INVENTION

It is, therefore, object of the present invention to provide a laminated film assuring a uniform surface emission with close tolerances and capable of being steadily produced for a long term, a method of producing the same, and a display device (particularly a liquid crystal display device) utilizing the film.

It is another object of the present invention to provide a laminated film having excellent storage stability, heat resistance, handling and the like, a method of producing the same, and a display device (particularly a liquid crystal display device) utilizing the film.

It is still another object of the present invention to provide a laminated film giving a uniform surface emission easily even if the light from a light source has an anisotropy of emission distribution (distribution of luminance) without compromise in luminance, a method of producing the same and a display device (particularly a liquid crystal display device) utilizing the film.

It is another yet object of the present invention to provide a laminated film having a good anisotropy of light scattering despite its high transparency, a method of producing the same, and a display device (particularly a transmission type liquid crystal display device) utilizing the film.

It is further object of the present invention to provide a reflection type liquid crystal display device which upholds the clarity of displayed data and has a strong display directionality.

It is another object of the present invention to provide a lenticular lens having a good anisotropy of light scattering as well as high heat resistance.

The inventors of the present invention did much research to accomplish the above objects and found that, a film comprises an anisotropic light-scattering layer having a continuous phase and a dispersed phase having the specific structure, so that extremely high optical anisotropy is impaired to a scattering light, and by using the film, an anisotropy (directionality) of the emission distribution of a light source such as a fluorescent tube can be relaxed without deteriorating luminance and further by laminating a transparent resin layer on the anisotropic light-scattering layer, not only the stability of the film producing step but also handling of the film, storage stability, heat resistance and the like are improved. Furthermore, the laminated film comprising the anisotropic light-scattering layer and the transparent resin layer is monoaxially stretched, so that the higher (sharper) optical anisotropy is impaired to the film with compared to the case of monoaxially stretching a film comprising the anisotropic light-scattering layer alone.

That is, a laminated film of the present invention comprises an anisotropic light-scattering layer and a transparent resin layer laminated on at least one side (in particular, both sides) of the light-scattering layer. The light-scattering layer is composed of a continuous phase and a particulate dispersed phase which have the different refraction indexes from each other, the mean aspect ratio of the particulate dispersed phase is more than 1 and the major (longitudinal) axis of the particulate dispersed phase is oriented in a direction. The transparent resin layer may be composed of the same kind of resins as one constituting the continuous layer. The laminated film may be capable of diffusing incident light in its advanced direction and having a light-scattering characteristic $F(\theta)$ satisfying the following expression representing the relation between the angle of light scattering $\theta$ and the intensity of scattered light F over a range of $\theta=4$ to $30°$:

$$Fy(\theta)/Fx(\theta)>5$$

wherein $Fx(\theta)$ represents the light-scattering characteristic in the direction of the major axis of the particulate dispersed phase and $Fy(\theta)$ represents the light-scattering characteristic in the direction normal to the major axis of the particulate dispersed phase.

The mean aspect ratio of the particulate dispersed phase may be 5 to 1,000. The mean dimension of the minor axis of the particulate dispersed phase may be 0.1 to 10 $\mu$m. The weight ratio of the continuous phase to the particulate dispersed phase may be [the continuous phase/the particulate dispersed phase]=99/1 to 30/70. The ratio in thickness of the anisotropic light-scattering layer (1) to the transparent resin layer (2) may be [the light-scattering layer/the transparent resin layer]=50/50 to 99/1, and the total thickness of the film may be 6 to 600 $\mu$m. The total light transmittance is usually not less than 85%.

The laminated film can be produced by coextruding a mixture of resins constituting the continuous phase and the dispersed phase, and a resin constituting the transparent resin layer to form a film under drawing. Moreover, the laminated film can be produced by coextruding a mixture of resins constituting the continuous phase and the dispersed phase, and a resin constituting the transparent resin layer, solidifying the extruded product and monoaxially stretching (e.g., monoaxially stretching by roll-calendering) the solidified product. The film may be monoaxially stretched at a temperature higher than the melting point or glass transition temperature of the resin constituting the dispersed phase.

The present invention also includes a display device comprising an image display module, a tubular light projector means disposed behind said image display module and adapted to project light to said module and the laminated film as disposed forwardly of said light projector means. The laminated film is disposed with the main axis of the particulate dispersed phase oriented in the longitudinal direction of said projector means. Further, the present invention includes a reflection type liquid crystal display device comprising the laminated film disposed, and a lenticular lens for projection television comprising the laminated film.

Throughout this specification, the term "film" is used without regard to thickness, thus meaning a sheet as well.

DETAILED DESCRIPTION OF THE INVENTION

[Anisotropic Light-scattering Layer (1)]

The anisotropic light-scattering layer (1) comprises a continuous phase (e.g. a continuous resin phase) and a particulate dispersed phase (e.g. a dispersed resin phase or a dispersed fiber phase) which is different in index of refraction from the continuous phase. Incidentally, the continuous phase and the dispersed phase are mutually incompatible or hardly compatible.

The resin which can be used for constituting the continuous resin phase and the dispersed resin phase includes thermoplastic resins (olefinic resin, halogen-containing resin, vinyl alcohol-series resin, vinyl ester-series resin, (meth)acrylic resin, styrenic resin, polyester-series resin, polyamide-series resin, polycarbonate-series resin, cellulose derivatives, etc.) and thermosetting resins (epoxy resin, unsaturated polyester resin, diallyl phthalate resin, silicone resin, etc.). The preferred resins are the thermoplastic resins.

The olefinic resin includes but is not limited to homopolymers of olefins such as polyethylene and poly propylene, copolymers of olefins such as ethylene-(meth)acrylic acid copolymer, etc.

The halogen-containing resin includes but is not limited to vinyl halide resins and vinylidene halide-series resins [for example, chlorine-containing resins (e.g., vinyl chloride resins such as polyvinyl chloride, vinyl chloride-vinyl acetate copolymer, vinyl chloride-(meth)acrylate copolymer, vinylidene chloride-series resins); fluorine-containing resins (e.g., polytetrafluoroethylene, polychlorotrifluoroethylene, poly (vinylidene fluoride), poly (vinyl fluoride), tetrafluoroethylene-hexafluoropropylene copolymer, tetrafluoroethylene-perfluoroalkyl vinyl ether copolymers, tetrafluoroethylene-ethylene copolymer).

The derivative of vinyl alcohol-series resin includes polyvinyl alcohol, ethylene-vinyl alcohol copolymers, etc.

The vinyl ester-series resin includes homo- or copolymers of vinyl ester-series monomers (e.g. polyvinyl acetate), copolymers of vinyl ester-series monomers with copolymerizable monomers (e.g. vinyl acetate-ethylene copolymer, vinyl acetate-vinyl chloride copolymer, vinyl acetate-(meth) acrylate copolymer, etc.).

The (meth)acrylic resin includes but is not limited to poly(meth)acrylates such as polymethyl(meth)acrylate, methyl methacrylate-(meth)acrylic acid copolymer, methyl methacrylate-acrylate-(meth)acrylic acid copolymers, methyl methacrylate-(meth)acrylate copolymers, and (meth) acrylate-styrene copolymers (MS resin). The preferred (meth)acrylic resin includes poly($C_{1-5}$ alkyl (meth)acrylate) and methyl methacrylate-acrylate copolymers.

The styrenic resin includes homo- or copolymers of styrenic monomers (e.g. polystyrene, styrene-α-methylstyrene copolymer) and copolymers of styrenic monomers with copolymerizable monomers (e.g. styrene-acrylonitrile copolymer (AS resin), styrene-(meth)acrylate copolymers, styrene-maleic acid anhydride copolymer).

The polyester-series resin includes aromatic polyesters obtainable from an aromatic dicarboxylic acid, such as terephthalic acid (for example, homopolyesters, e.g. poly-alkylene terephthalates such as polyethylene terephthalate, polybutylene terephthalate and copolyesters containing an alkylene terephthalate unit as a main component), aliphatic polyesters obtainable from an aliphatic dicarboxylic acid such as adipic acid.

The polyamide resin includes aliphatic polyamides such as nylon 46, nylon 6, nylon 66, nylon 610, nylon 612, nylon 11, nylon 12. The polyamide resin is not restricted to homopolyamide but may be copolyamides.

The polycarbonate-series resin includes aromatic polycarbonates based onbisphenols (e.g. bisphenol A) and aliphatic polycarbonates such as diethylene glycol bis-aryl carbonates.

The cellulose derivative includes cellulose esters (e.g. cellulose acetate, cellulose phthalate, etc.), cellulose carbamates (e.g. cellulose phenylcarbamate), cellulose ethers (e.g. cyanoethylcellulose, etc.).

Where necessary, the resin component may have been modified (e.g. rubber-modified).

It is also possible to form a continuous phase matrix from the resin component and to graft- or block-copolymerize the dispersed phase component with this matrix resin. As examples of the modified resin, there can be mentioned rubber-block copolymers (e.g. styrene-butadiene copolymer (SB resin)) and rubber-grafted styrenic resins (e.g. acrylonitrile-butadiene-styrene copolymer (ABS resin)).

The fibrous dispersed phase includes organic fiber and inorganic fiber. The organic fiber includes heat-resistant organic fibers such as aramid fiber, all-aromatic polyester fiber, polyimide fiber, etc.

The inorganic fiber includes but is not limited to fibrous fillers (e.g. inorganic fibers such as glass fiber, silica fiber, alumina fiber, zirconia fiber, etc.) and flaky fillers (e.g. mica etc.).

The preferred component for making up the continuous phase or the dispersed phase (discontinuous phase or dispersed phase) includes olefinic resin, (meth)acrylic resin, styrenic resin, polyester-series resin, polyamide-series resin and polycarbonate-series resin, among others. Moreover, the resin may be crystalline or noncrystalline, but as a resin constituting the dispersed phase, a noncrystalline resin is employed in many cases. The resin constituting the continuous phase may be a resin having a melting point or glass transition temperature of about 130 to 280° C., preferably about 140 to 270° C., more preferably about 150 to 260° C.

In the present invention, the continuous phase and discontinuous phase are constituted of components differing from each other in the index of refraction among the above components. By using components differing from each other in the index of refraction, the film can be provided with light-diffusing properties. The refractive index differential between the continuous phase and the discontinuous phase may for example be about 0.001 to 0.3, preferably about 0.01 to 0.3, more preferably about 0.01 to 0.1.

As the combination of resins giving such a defined refractive index differential, the following combinations may be mentioned by way of example.

(1) The combination of an olefinic resin (particularly a propylene-series resin) with at least one member selected from the group consisting of an acrylic resin, a styrenic resin, a polyester-series resin, a polyamide-series resin and a polycarbonate-series resin.

(2) The combination of a styrenic resin with at least one member selected from the group consisting of a polyester-series resin, a polyamide-series resin and a polycarbonate-series resin.

(3) The combination of a polyester-series resin with at least one member selected from the group consisting of a polyamide-series resin and a polycarbonate-series resin.

In the anisotropic light-scattering layer, the particulate dispersed phase are so configured that the ratio of the mean dimension L of the major (longitudinal) axis to the mean dimension W of the minor axis (mean aspect ratio, L/W) is larger than 1 and the direction of the major (longitudinal) axis of each particle substantially coincides with a direction (e.g., the direction of the given plane such as the longitudinal direction of the film). The preferred mean aspect ratio (L/W) may for example be about 2 to 1,000, preferably about 5 to 1,000, more preferably about 50 to 500. The morphology of the particulate dispersion phase may for example be a rugby football-like (e.g. spheroidal), filamentous or cuboid. The larger the aspect ratio is, the higher the transparency of the film is with maintaining the high anisotropy in the scattering of light.

The mean dimension L of the major axis of the dispersed phase may for example be about 1 to 300 μm, preferably about 10 to 250 μm, particularly about 20 to 200 μm, and usually about 30 to 150 μm. The mean dimension W of the minor axis of the dispersed phase may for example be about 0.1 to 10 μm, preferably about 0.3 to 5 μm, more preferably about 0.5 to 2 μm.

The orientation coefficient of the particulate dispersed phase may for example be not less than 0.7 (e.g. about 0.7 to 1), preferably about 0.8 to 1, more preferably about 0.9 to 1. The higher the orientation degree of the particulate dispersion phase is, the higher the anisotropy imparted to scattered light is.

The orientation coefficient can be calculated by means of the following equation.

$$\text{Orientation coefficient} = (3<\cos^2 \theta> - 1)/2$$

wherein θ represents the angle between the major axis of the particulate dispersed phase and the X-axis of the film (when the major axis is parallel to the X-axis, θ=0°); $<\cos^2 \theta>$ represents the average of $\cos^2 \theta$ values found for individual particulate dispersed phase and can be expressed as follows.

$$<\cos^2 \theta> = \int n(\theta) \cdot \cos^2 \theta \cdot d\theta$$

wherein n(θ) represents the percentage (weight percent) of the particulate dispersed phase having the angle θ in the total population of the particulate dispersed phase.

By constituting the anisotropic light-scattering layer with such particulate dispersed phase, the high anisotropy can be impaired to the light scattered from the light-scattering layer. Thus, the transmission light or reflection light can be strongly scattered in the direction perpendicular to the direction of the major axis of the particulate dispersed phase.

The ratio of the continuous phase to the dispersed phase can be judiciously selected with reference to the kinds, melt viscosity and light diffusing properties of the resins, and is, for example, [former/latter]=about 99/1 to 30/70 (weight ratio), preferably about 95/5 to 40/60 (weight ratio) (e.g., about 95/5 to 50/50 (weight ratio)), more preferably about 90/10 to 40/60 (weight ratio) (e.g., about 90/10 to 60/40 (weight ratio)).

Incidentally, the anisotropic light-scattering layer may contain the compatibilizing agent, if necessary. The compatibilizing agent can be selected from the conventional compatibilizing agents according to the species of continuous and dispersed phase and, for example, oxazoline compounds, modified resins (e.g., modified resins with at least one modifying group selected from carboxyl, acid anhydride, epoxy, oxazolinyl and other groups), rubber-containing resins (e.g. acrylonitrile-butadiene-styrene copolymer (ABS resin), hydrogenated styrene-butadiene (SB) block copolymer, hydrogenated styrene-butadiene-styrene block copolymer (SEBS), hydrogenated (styrene-ethylene/butylene-styrene) block copolymer, epoxy-modified styrene-butadiene (SB) block copolymer, etc.).

As the compatibilizing agent, a block or graft copolymer having the same components as, or components capable of mixing with, the polymer blend constituent resins can be employed. The amount of the compatibilizing agent can be selected from the range of about 0.1 to 20% by weight, preferably about 0.5 to 15% by weight and more preferably about 1 to 10% by weight relative to the whole resin composition.

The thickness of the anisotropic light-scattering layer can be selected from the range of, for example, about 3 to 300 $\mu$m, preferably about 30 to 200 $\mu$m, more preferably about 50 to 150 $\mu$m.

[Transparent Resin Layer (2)]

According to the present invention, the transparent resin layer is laminated on at least one side (in particular, both sides) of the anisotropic light-scattering layer. When the film is composed of the anisotropic light-scattering layer alone, the dispersed phase is stuck to a roll used for transferring or stretching the film due to weak adhesion of the particulate dispersed phase with the continuous phase. While, when the anisotropic light-scattering layer is protected by the transparent resin layer, it can be inhibited that the dispersed phase is stuck to a roll, and the stability in the film-producing process can be improved. Further, even when the film is wound or laminated for preservation, it can be inhibited that the particulate dispersed phase is transferred to the adjacent film by means of the transparent resin layer, and that the films are adhered to each other (blocking). Further, by protecting the anisotropic light-scattering layer with the transparent resin layer, flaw resistance and strength of the film can be improved and in spite of applying a bent force, it is difficult for the film to form a fold. Thus, the handling of the film can be improved. As compared with the case that the film composed of the anisotropic light-scattering layer alone is monoaxially stretched, when the laminated film is monoaxially stretched, the aspect ratio of the dispersed phase can be enhanced, so that the film can be provided with the high (sharp) optical anisotropy.

The resin constituting the transparent resin layer can be selected from the resins exemplified as the resins constituting the continuous phase or the dispersed phase. It is preferred that the transparent resin is composed of the same kind of resins (in particular, the same resin) as one constituting the continuous phase.

The preferred transparent resin includes a resin having heat resistance (e.g. a resin having high glass transition temperature or melting point), a crystalline resin and the like. By using such resins, the heat resistance of the laminated film can be improved. There is no possibility that the blocking of the films occurs during keeping the film in storage since the above resin has weak adhesion under the circumstance of high temperature and high humidity. The glass transition temperature or melting point of the resin constituting the transparent resin layer may be the same degree as that of the resin constituting the continuous phase, and may be, for example, about 130 to 280° C., preferably about 140 to 270° C., more preferably about 150 to 260° C.

The thickness of the transparent resin layer can be suitably selected according to the thickness of the anisotropic light-scattering resin layer, and may be, for example, about 3 to 300 $\mu$m, preferably about 3 to 150 $\mu$m, more preferably about 5 to 100 $\mu$m. In particular, when the thickness of the anisotropic light-scattering layer is about 3 to 300 $\mu$m, the thickness of the transparent resin layer can be selected from the range of 3 to 150 $\mu$m.

The ratio in thickness of the anisotropic light-scattering layer and the transparent resin layer can be selected from wide range, and is, for example, anisotropic light-scattering layer/transparent resin layer=about 5/95 to 99/1, preferably about 50/50 to 99/1, more preferably about 70/30 to 95/5.

The thickness of the laminated film is, for example, about 6 to 600 $\mu$m, preferably about 10 to 400 $\mu$m, more preferably about 20 to 250 $\mu$m. When the film is too thick, assembling the film into a display device results in an unduly increased thickness of the device. Moreover, the film is too thin, the film tends to form a bent or curl, so that the handling of the film is lowered.

The total light transmittance of the laminated film is 85% or more (about 85 to 100%), preferably about 90 to 100%, more preferably about 90 to 95%. When the total light transmittance is less than 85%, the brightness is seriously lowered due to the light scattering, thus the brightness of the display device is insufficient.

Figure 1:
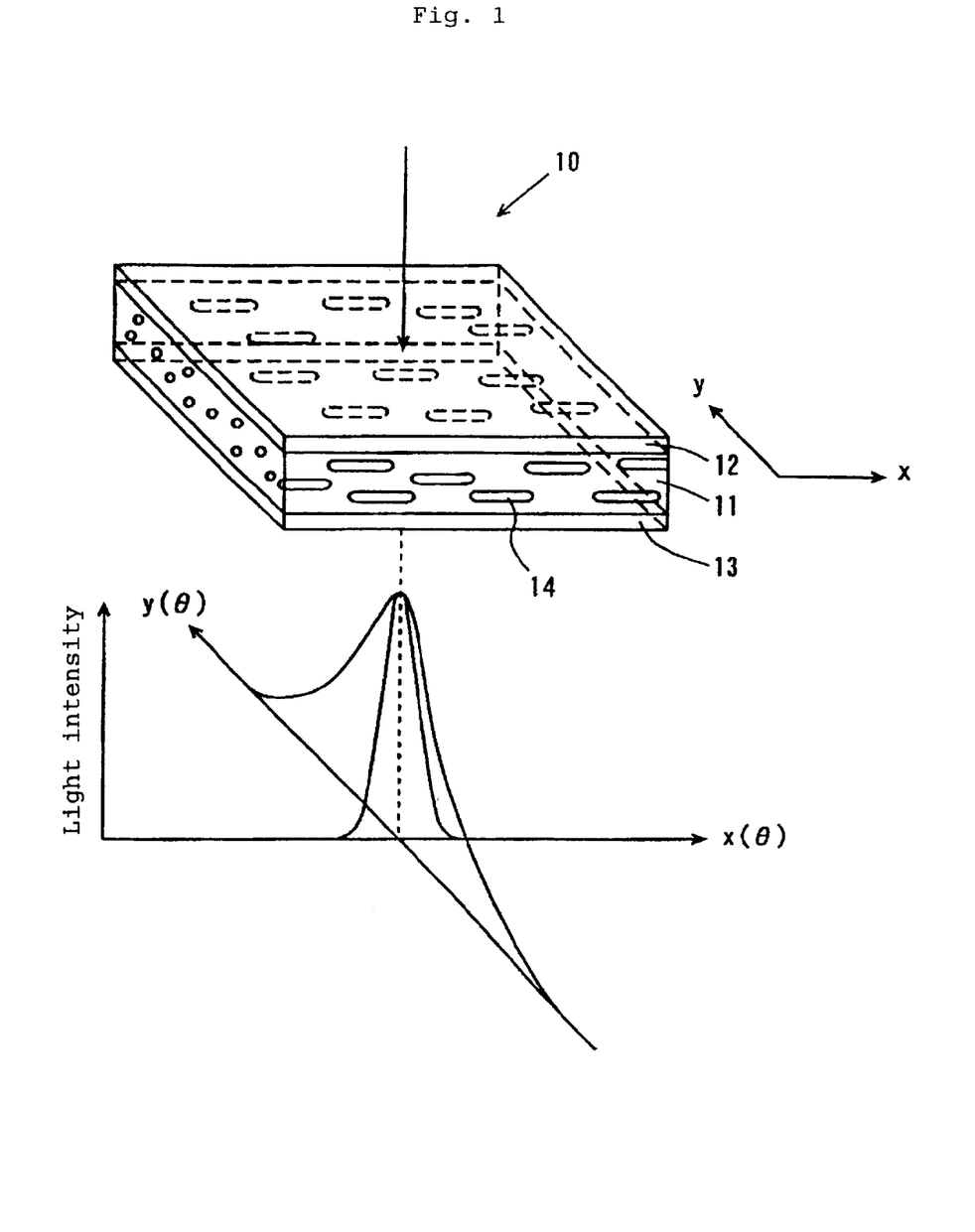
FIG. 1 is a conceptual view illustrating the anisotropy of light scattering of the film of the invention.

By the laminated film of the present invention, for example, a scattering light from the laminated film can be provided with high anisotropy since the film has the anisotropic light-scattering layer. FIG. 1 is a conceptual view illustrating the relationship between the laminated film of the invention and the anisotropy of a scattering light. In this figure, the laminated film 10 comprises an anisotropic light-scattering layer 11, and the transparent resin layers 12, 13 laminated on the both sides of the light-scattering layer 11. The light-scattering layer 11 contains the particulate dispersed phase 14 with the longitudinal axis of the particulate dispersed phase 14 being oriented to the given direction (hereinafter referred to x axis direction). In the direction of the longitudinal axis of the particulate dispersed phase 14 (x axis direction), the light scattering property for incident light is small, while in the direction which is normal to the direction of the longitudinal axis (y axis direction), the light scattering property is large. Therefore, in terms of the scattering characteristic F($\theta$) relevant to the relation between the scattering angle $\theta$ and the intensity of scattered light F, the laminated film of the present invention satisfies the following relation (1), preferably relation (2).

$$Fy(\theta)/Fx(\theta) > 5 \quad (\theta = 4 \text{ to } 30°) \tag{1}$$

$$Fy(\theta)/Fx(\theta) > 10 \quad (\theta = 2 \text{ to } 30°) \tag{2}$$

Wherein $Fx(\theta)$ represents the scattering characteristic in the direction of the X-axis (the longitudinal direction or the take-up direction) of the film and $Fy(\theta)$ represents the scattering characteristic in the direction of the Y-axis normal to the X-axis.

As the anisotropy represented by $Fy(\theta)/Fx(\theta)$ is too small, the uniform surface emission can not be obtained when the film is adopted to a liquid crystal display device.

Incidentally, when the light-scattering characteristic in the $\psi$ direction which is intermediate between the X-axis and Y-axis directions is written as $F\psi(\theta)$ (where $\psi$ represents the angle made with the X-axis direction; the X-axis direction corresponds to $\psi=0°$ and the Y-axis direction corresponds to $\psi=90°$), the anisotropic diffusing film of the present invention need not necessarily have an anisotropy insuring that $F\psi(\theta)$ ($\psi\neq90°$) will be approximately equal to $Fx(\theta)$, but preferably $F\psi(\theta)$ ($\psi\neq90°$) is close to $Fx(\theta)$. Such a film is capable of scattering light with high anisotropy.

Figure 2:
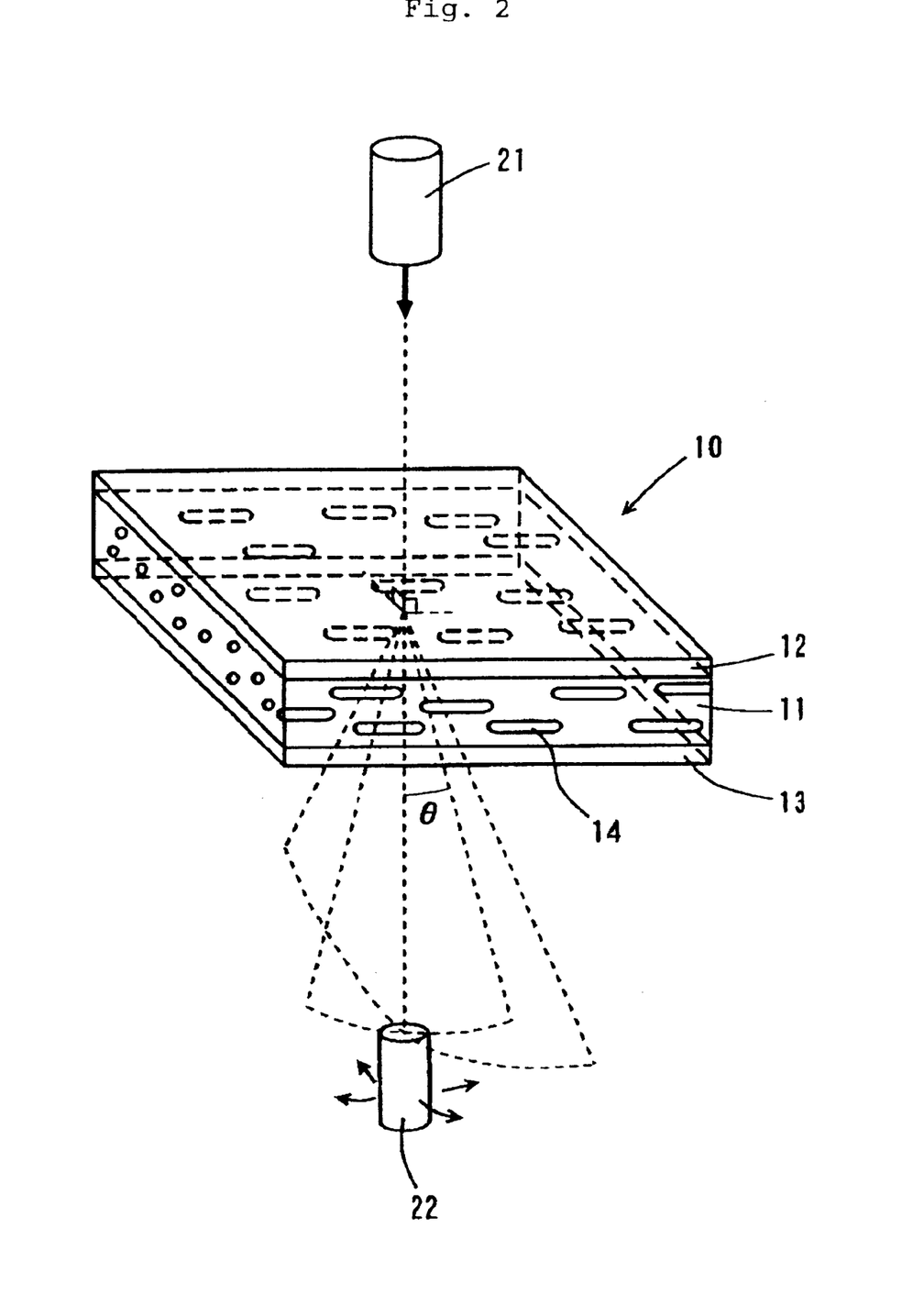
FIG. 2 is a schematic cross-section view showing the method for measurement of scattered light intensity.

The light scattering characteristic $F(\theta)$ can be measured using an instrument shown in FIG. 2. This instrument comprises a laser irradiating unit (NIHON KAGAKU ENG., NEO-20MS) 21 disposed on front side of the laminated film 10 and a detector 22 for quantitating the intensity of the light transmitted through the laminated film 10. The laser light is emitted at an perpendicular with respect to the front side of the laminated film 10 and the intensity of light diffused by the film (diffusion intensity) F is determined (plotted) against the diffusing angle θ, whereby the light-scattering characteristic can be determined.

When such a laminated film is used as, for example, the anisotropic diffusing film of the backlight unit illustrated in FIG. 4, the nonuniform (zigzag) emission distribution (luminance distribution) in the direction normal to the longitudinal axis of the fluorescent tube (Y-axis direction) can be uniformized so that the generation of linear dark areas can be prevented.

If necessary, the laminated film of the present invention may be provided with directionality of the diffused light. When the diffused light has directionality, referring to the measuring system depicted in FIG. 2, when the diffused light intensity F is plotted against the diffusion angle θ, the curve of plots has a maximum or a shoulder (especially a maximum) within a given range of diffusion angle θ.

For imparting the directionality, the refractive index differential between the continuous phase resin and the particulate dispersed phase may for example be about 0.005 to 0.2, preferably about 0.01 to 0.1, and the mean dimension of the major axes of particles may for example be about 1 to 100 μm, preferably about 5 to 50 μm. The aspect ratio may for example be about 10 to 300, preferably about 20 to 100.

Optionally, the laminated film may be formed with surface irregularities extending along its X-axis. When such surface irregularities are provided, a higher degree of anisotropy can be imparted to the film.

Moreover, in order to enhance blocking resistance of the laminated film, as far as the optical properties of the film is not deteriorated, the releasing agent such as silicone oil may be applied on a surface of the film, and a surface of the film may be treated by corona discharge.

The laminated film may contain the conventional additives, for example stabilizers such as an antioxidant, an ultraviolet absorber, a heat stabilizer, etc.; a plasticizer, an antistatic agent, a flame retardant and a filler.

[Process for Producing the Laminated Film]

The process for producing the laminated film is not particularly limited as far as laminating the anisotropic light-scattering layer and the transparent resin layer, and includes, for example, (1) a process which comprises laminating the anisotropic light-scattering layer and the transparent resin layer by coextrude-molding method, (2) a process which comprises molding one layer of the anisotropic light-scattering layer and the transparent resin layer and laminating the other layer on the resulting film by extruding (e.g., forming the anisotropic light-scattering layer in the form of film and laminating the transparent resin layers on both sides of the film by extruding), (3) a process which comprises molding each of the isotropic light-scattering layer and the transparent resin layer in the form of a film and laminating the resultant films each other and the like. The preferred process includes a process which comprises (1) laminating the anisotropic light-scattering layer and the transparent resin layer by coextrude-molding method.

When laminating by the coextruding molding technique (1), the film can be produced by the conventional method such as multilayer extrude molding method (multilayer T-die method, multilayer inflation method). For example, the film may be produced by melt-kneading the continuous phase-forming resin with the dispersoid-forming component (resin component, fibrous component, in particular resin component) by a conventional method (e.g. melt-blending method, tumbler method, etc.), and coextruding the melt-kneaded mixture and the transparent resin layer-forming resin with laminating in the melting state.

The melting temperature is not lower than the glass transition temperature or the melting points of the resin components (continuous phase resin, dispersed phase resin, transparent layer resin), for example about 150 to 290° C., preferably about 200 to 260° C.

According to the presenet invention, the laminated film (in particular, coextruded film) is subjected to the orientation treatment in the production process of the film (e.g., a forming step of the film). The orientation treatment can be achieved by, for example, the method comprising coextruding the resins constituting the laminated film and giving a draft (or draw) to form the film in the course of extrusion, the method comprising solidifying the laminated film which has been formed and monoaxially stretching the film. By treating the film with the above process, the particles of the particulate dispersed phase can be oriented along draw direction or the stretching direction. Incidentally, if necessary, a draw treatment may be combined with the monoaxial stretching treatment.

The draw ratio (draft) may for example be about 5 to 80, preferably about 10 to 60, more preferably about 20 to 40.

The stretching factor (multiples) may for example be about 1.1 to 50 (e.g. about 3 to 50), preferably about 1.5 to 30 (e.g. about 5 to 30).

When the drawing and stretching are conducted in combination, the draw ratio may for example be about 2 to 10, preferably about 2 to 5, and the stretching factor may for example be about 2 to 20, preferably about 3 to 10.

The preferred stretching technology includes the method of subjecting the laminated film (for example, a formed and cooled laminated film) to monoaxial stretching. Compared with the method of forming a film under draft, the aspect ratio of the dispersed phase can be easily increased by this stretching.

The technologies for monoaxial stretching is not particularly restricted but includes the method in which both edges of a solidified laminated film are pulled in opposite directions (pull stretching), the method using two or more pairs of opposed rollers (2-roll sets) arranged serially (e.g. in a series of 2 pairs) wherein the film is passed over the rollers constituting each roll set by guiding it through the respective roll nips and stretched by driving the 2-roll set on the pay-out side at a speed higher than the speed of the 2-roll set on the feed side (inter-roll stretching), and the method in which the film is passed through the nip of a pair of opposed rollers and stretched under the roll pressure (roll calendering).

The preferred monoaxial stretching technology includes inter-roll stertching and roll-calendering. These methods facilitate the mass production of film.

The particularlly preferred monoaxial stretching technology includes roll-calendering. Particularly by roll calender method, not only a noncrystalline resin but also a crystalline resin can be easily stretched. Thus, when a crystalline resin is stretched monoaxially, usually the trouble of "neck-in", the phenomenon of local reduction in the thickness and width of the film, tends to occur. In the roll calender method, however, in spite of the using a crystalline resin, the trouble of "neck-in" can be precluded so that the film stretching operation is stabilized. Since there is no change (reduction) in film width before and after stretching and the film thickness in the transverse direction can be made uniform so that the light-scattering characteristic can be uniformized in the transverse direction of the film, the quality assurance of the product be facilitated, and the useful rate (yield) of the film be improved. Furthermore, the stretching factor can be freely selected from a broad range. In addition, in roll calendering method, wherein the film width can be maintained before and after stretching, the reciprocal of the rate of reduction in film thickness is approximately equal to the stretching factor.

Incidentally, when the film made of the anisotropic light-scattering layer alone is stretched by roll-calendering, there is possibility that the dispersed resin is seriously stuck to a roll. However, according to the present invention, even when the anisotropic light-scattering layer is protected by the transparent resin layer, the dispersed resin is not stuck to a roll even when roll-calendering the film.

The roll pressure for roll calendering may for example be about $9.8 \times 10^3$ to $9.8 \times 10^6$ N/m, preferably about $9.8 \times 10^4$ to $9.8 \times 10^6$ N/m.

The stretching factor of the roll-calendering (the reciprocal of the rate of reduction in film thickness) can be selected from a broad range and may for example be about 1.1 to 10 (a thickness reduction rate of about 0.9 to 0.1), preferably about 1.3 to 5 (a thickness reduction rate of about 0.77 to 0.2), more preferably about 1.5 to 3 (a thickness reduction rate of about 0.67 to 0.33).

In the monoaxially stretching, the stretching temperature is not particularly restricted inasmuch as the film can be stretched and may be over the melting point or glass transition point of the dispersoid resin. Further, the stretching temperature, in case the continuous-phase resin is a crystalline resin, may be below the melting point of the resin and in the neighborhood of the melting point and, in case the continuous-phase resin is a noncrystalline resin, may be a temperature below the glass transition point and in the neighborhood of the glass transition point. For example, the stretching temperature may be lower by about 1 to 50° C., preferably about 5 to 40° C. and more preferably about 10 to 30° C. than the melting point or the glass transition temperature of the continuous phase resin. Moreover, when a resin having a glass transition point or melting point higher than that of the dispersoid phase resin (for example, a resin having a Tg or melting point higher by about 5 to 200° C., preferably about 5 to 100° C.) is used as the continuous phase-forming resin and the film is monoaxially stretched while the dispersoid resin is melted or softened, the aspect ratio of the particulate dispersed phase can be increased because the dispersoid resin is by far readily deformed as compared with the continuous phase resin so that a film having a particularly large anisotropy of light scattering can be obtained. The preferred stretching temperature may for example be about 100 to 200° C., preferably about 110 to 180° C.

The laminated film according to the present invention can be used in display devices (such as a transmission type (mode) liquid crystal display device). This display device may for example comprise a display module (e.g. a transmission type liquid crystal display module) and, as disposed behind the module, a tubular projector means (e.g. a backlight such as a fluorescent tube), with the laminated film of the invention being positioned forwardly of the projector means. Here, the laminated film of the present invention may be disposed in front of the display module or between the display module and the projector means. For example, the laminated film of the present invention can be used as the diffuser shown in FIG. 4 or FIG. 5.

In the above display device, the laminated film of the present invention is disposed in such a manner that the X-axis of the film is aligned with the longitudinal direction (the direction of the X-axis) of the light projector means (light source). Moreover, the Y-axis of the film is aligned with the direction of the Y-axis which is normal to the longitudinal direction of the projector means. On the other hand, the light from the light projector means has a uniform emission distribution in the direction of the X-axis but the emission distribution in the direction of the Y-axis is not uniform. When the anisotropic diffusing film is disposed with respect to such a light projector mean, the film gives a small scattering of light in the direction of the X-axis and a large scattering of light in the direction of the Y-axis so that the light in the direction of the X-axis, which is uniform, is little scattered but only the non-uniform light in the direction of the Y-axis is highly scattered to make the emission distribution uniform. Therefore, the emission distribution can be uniformized while the decrease in luminance is suppressed so the generation of streaks (linear dark areas) on the display screen can be inhibited.

In installing the laminated film, the direction of the X-axis of the film need not be exactly aligned with the longitudinal direction (the direction of the X-axis) of the light projector means (light source) but may be allowed to deviate somewhat inasmuch as the emission distribution can be uniformized. The angle between the longitudinal direction and the X-axis of the film may for example be about 0 to 20°, usually about 0 to 10°.

The laminated film of the present invention can be utilized in other kinds of display devices, such as the reflection type liquid crystal display device and the projection television. In applying the light-scattering film to a reflection type liquid crystal display device, the laminated film can be disposed to traverse the light path (the path of incidence, the path of reflection, etc.) of the liquid crystal (LC) cell having a liquid crystal sealed therein. For example, in the reflection type liquid crystal display device depicted in FIG. 8, the laminated film of the present invention can be disposed in the position of diffuser 83. When the laminated film is applied to a reflection type liquid crystal display device, a specialized reflection type LC display device varying in the angle of visual field between the X-axis direction and the Y-axis direction can be constructed because the diffusability of light by the film is large in the Y-axis direction and small in the X-axis direction. Moreover, when the laminated film has directionality, there can be obtained a display device having a high image clarity and a high display directionality.

When the laminated film is applied to projection television, the laminated film can be used as the lenticular lens of the projection TV screen. Because of its high transparency and high anisotropy of diffused light, the use of the laminated film of the present invention results in an increased TV luminance. Furthermore, when a resin having high-melting point is used as the continuous-phase resin or the transparent layer resin, a high heat resistance can be imparted to the lenticular lens.

According to the laminated film of the present invention, since the anisotropic light-scattering layer is protected by the transparent resin layer, the laminated film can be steadily produced for a long term. Moreover, the blocking of the film and the transference of the dispersed phase can be inhibited by means of the transparent resin layer and the storage stability of the film can be improved. By forming a laminated structure, the film strength can be enhanced and the handling of the film can be improved. Further, since the transparent resin layer forming the surface layer is made of a resin having a high softening temperature, the heat resistance of the film can be improved. Furthermore, when the laminated film is stretched, an aspect ratio and the orientation of the particulate dispersed phase can be dramatically enhanced and scattering light can be exceedingly provided with high anisotropy. Therefore, a uniform emission distribution can be realized with close tolerances and without compromise in luminance even when a light projector means having an anisotropic (directional) emission distribution (such as a tubular light projector means) is employed. Thus, this laminated film can be utilized with advantage in display devices, for example a transmission type liquid crystal display device utilizing a light projectors having an anisotropy of emission distribution (e.g. backlight). Moreover, when the film is applied to a reflection type liquid crystal display device, the high clarity of displayed data can be maintained and a high display directionality can be imparted. Furthermore, the film can be used as a lenticular lens having good heat resistance and high light scattering anisotropy.

EXAMPLES

The following examples illustrate the present invention in further detail without defining the scope of the invention.

It should be understood that the films obtained in the examples and comparative example were evaluated by the following methods.

[Anisotropy]

Using the measuring system illustrated in FIG. 2, one side of the laminated film was irradiated with laser light and, of the transmitted light, the intensity F of scattered light at the diffusion angle θ was measured. The stretching direction of the film (the direction of the major axis of the particulate dispersed phase) was designated as X and the direction normal to this direction was designated as Y.

[Production Stability]

The frequency of adhesion to a roll of the particulate dispersed phase was visually evaluated according to the following criteria.

A: the particulate dispersed phase does not adhere to a roll at all, and the production stability for a long time was significantly high.

B: the frequency of the adhesion to the whole of a roll of the particulate dispersed phase is about 1 time per a day, and the production stability for a long time is high.

C: the frequency of the adhesion to the whole of a roll of the particulate dispersed phase was about 2 times or more per a day, and the production stability for a long time is low.

[Stability for Storage]

One hundred of the laminated films were stacked, and pressure of 980 Pa (10 g/cm$^2$) was applied at 60° C. for 24 hours. After removing the applied pressure and cooling the film to room temperature, each film was peeled, and the difficulty in peeling (strength of adhesion) of the film was evaluated according to the following criteria.

A: there is no film adhered (stuck) to each other tightly and all films were peeled with great ease.

B: there is no film adhered to each other tightly but there is some films which was adhered slightly and tends to be difficult in peeling.

C: there is some films adhered to each other tightly.

[Handling]

The film was wound along a stick having 10 to 50 mm of a diameter. It was determined whether the fold was made or not and the film was evaluated according to the following criteria.

A: the fold is not made even when the film was wound along a 10 mm-diameter stick.

B: the fold is made when the film was wound along a 10 mm-diameter stick, and the fold is not made when the film was wound along a 50 mm-diameter stick.

C: the fold is made when the film was wound along a 50 mm-diameter stick.

[Uniformity of the Emission Surface]

In the transmission type liquid crystal display device illustrated in FIG. 4, the laminated film obtained in each of the examples and comparative example was used as the diffuser 43 and the uniformity of the emission surface was evaluated according to the following criteria. The laminated film was disposed in such a manner that the direction of its X-axis (the major axis of the dispersed phase) would be in parallel with the longitudinal direction of the fluorescent tube. With any of the films, no uniform image display could be obtained when the anisotropic diffusing film was disposed with its X-axis (the major axis of the dispersed phase) oriented perpendicular to the axial direction of the fluorescent tube.

A: Extremely high uniformity of the emission surface
B: High uniformity of the emission surface
C: Streaks are observed.

[Directionality]

As the diffuser 83 of the reflection type liquid crystal displace device illustrated in FIG. 8, the laminated films obtained in the examples and comparative example were respectively used. The directionality of reflected light was visually evaluated according to the following criteria.

A: Extremely high directionality
B: High directionality
C: No directionality

[Heat Resistance]

Using the light source for projection television, the laminated films obtained in the examples and comparative example were irradiated. The irradiated films were visually inspected and evaluated according to the following criteria.

A: No deformation of the film
B: The film is deformed but the uniformity of light scattering is sustained
C: The film is deformed and the uniformity of light scattering is lost.

Example 1

As the continuous-phase resin, 60 weight parts of PP (polypropylene, Grand Polymer Co.; F109BA, refractive index 1.503), as the dispersoid resin, 36 weight parts of noncrystalline copolyester PET-G (polyester-series resin, EASTMAN CHEMICAL CO.; Eastar PETG GN071, refractive index 1.567) and as the compaibilizing agent, 4 weight parts of epoxydized diene-series block copolymer resin (Daicel Chemical Industries Ltd.; EPOFRIEND AT202; styrene/butadiene=70/30 (weight ratio), epoxy equivalent 750, refractive index 1.57) were used. The refractive index differential between the continuous phase resin and the dispersed phase resin was 0.064.

Moreover, as the transparent layer resin, the same resin as the continuous phase resin was employed.

The above continuous-phase resin and dispersoid resin were dried at 70° C. for about 4 hours and kneaded in a Banbury mixer. Using an coextruder of two species and three layered type, the kneaded product and the transparent resin were melted at about 240° C. and coextruded from a T-die at a draw ratio of about 3 onto a cooling drum set to a surface temperature of 80° C. (melt-molding of the laminated (muliti-layered) film). The laminated film (250 $\mu$m-thick) was produced which has three layered structure of 200 $\mu$m thick of the anisotropic light-scattering layer (the layer obtained by kneading and melting the continuous phase resin and the dispersed phase resin) as a center layer and each 25 $\mu$m-thick of the transparent resin layer as a surface layer and a back layer. Observation of the film by transmission electron microscopy (TEM) revealed that the aspect ratio of the dispersed phase in the center layer was distributed within the range of about 1 (an approximately sphere-like, the average particulate size of about 5 $\mu$m) to 4 (a rugby ball-like, the dimension of longitudinal axis of about 12 $\mu$m, the dimension of the minor axis of 3 $\mu$m). Moreover, the center layer was covered with the transparent resin layers in almost uniform thickness.

This film was monoaxially stretched by the roll calendering method (130° C., stretching factor of about 2 times, thickness reduction rate (film thickness before calendering/film thickness after calendering) of about 0.5, width reduction rate of the film (100−(film width before calendering/film width after calendering)×100) of about 3%) to obtain a 125 $\mu$m-thick film (about 100 $\mu$m-thick of a center layer (anisotropic light-scattering layer), surface layer and back layer each having about 13 $\mu$m-thick). Observation of this film by TEM revealed that the dispersed phase particle of the canter layer was shaped like an elongated fiber, with a mean major axis dimension of about 60 $\mu$m and a mean minor axis dimension of about 0.8 $\mu$m.

Comparative Example 1

As the continuous phase resin, the dispersed phase resin and the compaibilizing agent, the same resins as one used in Example 1 were employed. Each resin was dried at 70° C. for 4 hours, and kneaded in a Banbury mixer. Using a monolayered extruder, the kneaded product was melted at about 240° C. and extruded from a T-die at a draw ratio of about 3 times onto a cooling drum set to a surface temperature of 25° C. (melt-molding of the monolayered film). The layer obtained by melt-kneading the continuous phase resin and the dispersed phase resin had the almost same thickness (about 200 $\mu$m thick) as the center layer of Example 1. Observation of the film by scanning electron microscopy (SEM) revealed that the dispersed phase had the same structure as that of Example 1.

The above film was monoaxially stretched by roll-calendering in the similar manner to Example 1 to obtain a 100 $\mu$m-thick film. The stretching factor (calendering factor) and a width reduction rate were almost same as Example 1. Observation of this film by TEM revealed that the dispersed phase was shaped like a fiber, with a mean major axis dimension of about 30 $\mu$m and a mean minor axis dimension of about 1.5 $\mu$m.

Example 2

The film was produced in the similar manner to Example 1 except that the thickness of the laminated film after coextruding was 300 $\mu$m (the thickness of the center layer was 200 $\mu$m, the each thickness of the surface layer and the back layer was 50 $\mu$m). Observation of the film by scanning electron microscopy (SEM) revealed that the dispersed phase had the same structure as that of Example 1. The thickness of the surface layer and the back layer were almost uniform.

The above film was monoaxially stretched by roll-calendering in the similar manner to Example 1 to obtain a 150 $\mu$m-thick film (the thickness of the center layer is 100 $\mu$m and each thickness of the surface layer and the back layer was about 25 $\mu$m). The stretching factor (calendering factor) and a width reduction rate of the film were approximately same as Example 1. Observation of this film by TEM revealed that the dispersed phase of the center layer was shaped like an elongated fiber, with a mean major axis dimension of about 50 $\mu$m and a mean minor axis dimension of about 1 $\mu$m.

Example 3

The 250 $\mu$m-thick laminated film (unstretching) was obtained in the similar manner to Example 1.

This film was monoaxially stretched by roll stretching (150° C., stretching rate of 5 times). The film width reduction rate was about 10%. In the resulting film, the both edges was thick, and the thickness of the center area was approximately uniform. The uniform area was about 70% area of the whole width and the thickness was about 70 $\mu$m. Observation of this film by TEM revealed that the dispersed phase was shaped like a fiber, with a mean major axis dimension of about 100 $\mu$m and a mean minor axis dimension of about 0.7 $\mu$m.

The anisotropy, the production stability, the stability for storage, handling, uniformity, directionality and heat resistance of the films obtained in the examples and comparative example were evaluated. The results are shown in Table 1. In addition, the anisotropy of the film according to Example 1 is diagrammatically represented in FIG. 3.

TABLE 1

| | Light-scattering anisotropy Fy(θ)/Fx(θ) | | production stability | Stability for storage | Handling | Uniformity | Directionality | Heat resistance |
|---|---|---|---|---|---|---|---|---|
| | θ = 4° | θ = 15° | | | | | | |
| Ex. 1 | 34 | 600 | A | A | A | A | A | A |
| Ex. 2 | 25 | 500 | A | A | A | A | A | A |
| Ex. 3 | 40 | 400 | A | B | B | A | A | A |
| Comp. Ex. 1 | 6 | 200 | C | C | C | B | A | A |

Figure 3:
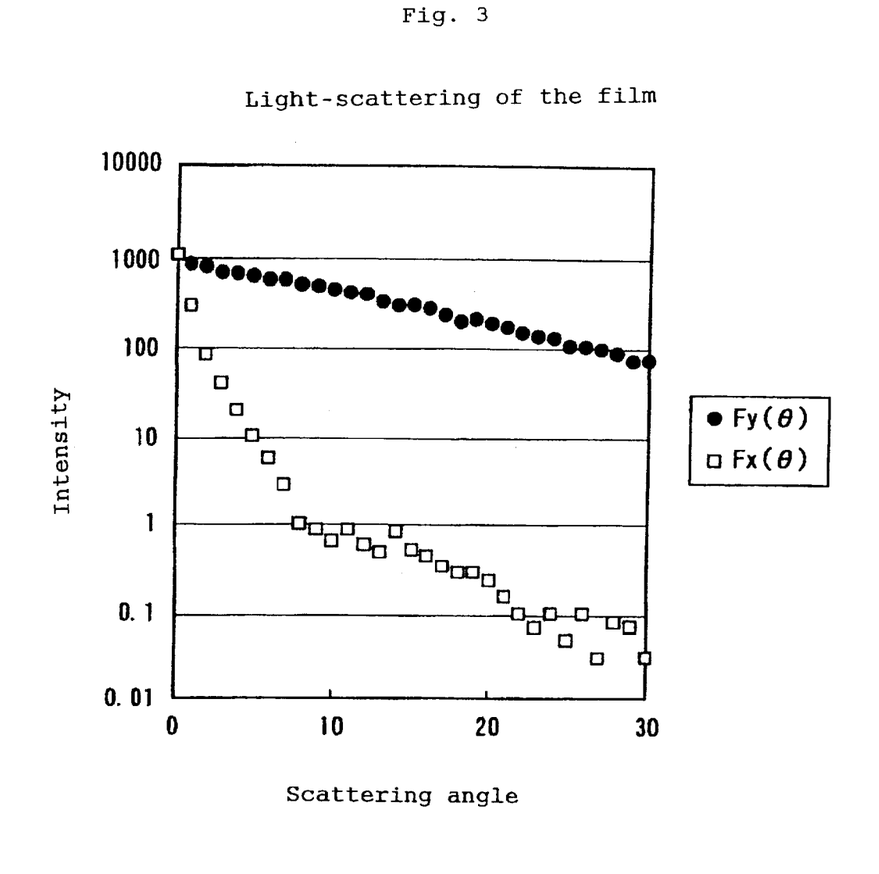
FIG. 3 is a graph showing the intensity of scattered light as measured with the film according to Example 1.

It is apparent from Table 1 and FIG. 3 that the films according to the examples have high anisotropy as compared with the film prepared in the comparative example. Moreover, the former films were found to be superior in uniformity, directionality and heat resistance as well.

What is claimed is:

1. A laminated film which comprises (1) an anisotropic light-scattering layer and (2) at least one transparent resin layer laminated on at least one side of the light-scattering layer, wherein the light-scattering layer is composed of a continuous phase of crystalline or non-crystalline resin and a particulate dispersed phase of non-crystalline resin, which phases differ in the index of refraction from each other, the mean aspect ratio of the particulate dispersed phase is 5 to 1000 and the major axis of the particulate dispersed phase is oriented in a direction, and wherein the transparent resin layer is composed of the same kind of resin as one of those constituting the continuous layer, the film diffusing incident light in its advance direction and having a light-scattering characteristic F(θ) satisfying the following expression, which represents the relationship between the angle of light scattering θ and the intensity of scattered light F over a range of θ=2 to 30°, $$Fy(\theta)/Fx(\theta) > 10$$

wherein Fx(θ) represents the light-scattering characteristic in the direction of the major axis of the particulate dispersed phase and Fy(θ) represents the light-scattering characteristic in the direction normal to the major axis of the particulate dispersed phase.

2. A reflection type liquid crystal display device comprising the laminated film recited in claim 1 as disposed in the light path of a reflection type liquid crystal display module.

3. A lenticular lens for projection television which comprises the laminated film recited in claim 1.

4. An laminated film according to claim 1, wherein the combination of the continuous phase and the particulate dispersed phase is selected from (i) a combination of an olefinic resin with at least one member selected from the group consisting of an acrylic resin, a styrenic resin, a polyester-series resin, a polyamide-series resin and a polycarbonate-series resin, (ii) a combination of a styrenic resin with at least one member selected from the group consisting of a polyester-series resin, a polyamide-series resin and a polycarbonate-series resin or (iii) a combination of a polyester-series resin with at least one member selected from the group consisting of a polyamide-series resin and a polycarbonate-series resin.

5. An laminated film according to claim 1, wherein the transparent resin layers (2) are laminated on the both sides of the anisotropic light-scattering layer (1).

6. A display device comprising an image display module, a tubular light projector means disposed behind said image display module and adapted to project light to said module and the laminated film recited in claim 1 as disposed forwardly of said light projector means, wherein said laminated film is disposed with the main axis of the particulate dispersed phase oriented in the longitudinal direction of said projector means.

7. A display device according to claim 6, wherein the image display module is a transmission type liquid crystal display module.

8. An laminated film according to claim 1, wherein the thickness ratio of the anisotropic light-scattering layer (1) to the transparent resin layer (2) is [the light-scattering layer/the transparent resin layer]=50/50 to 99/1, the total thickness of the film is 6 to 600 μm, and total light transmittance is not less than 85%.

9. An laminated film according to claim 1, wherein the weight ratio of [the continuous phase/particulate dispersed phase]=99/1 to 30/70.

10. An laminated film according to claim 1, wherein the laminated film is formed with surface irregularities extending in the direction of the major axis of the particulate dispersed phase.

11. A method of producing the laminated film recited in claim 1 which comprises coextruding a mixture of resins constituting the continuous phase and the dispersed phase, and the transparent resin layer to form a film under drawing.

12. A method of producing the laminated film recited in claim 1 which comprises coextruding a mixture of resins constituting the continuous phase and the dispersed phase, and a resin constituting the transparent resin layer, solidifying the extruded product and monoaxially stretching the solidified product.

13. A method of producing the laminated film according to claim 12, wherein the film is monoaxially stretched at a temperature higher than the melting point or glass transition temperature of the resin constituting the dispersed phase.

14. A method of producing the laminated film according to claim 12, wherein the film is monoaxially stretched by roll-calendering.

15. An laminated film according to claim 1, wherein the mean dimension of the minor axis of the particulate dispersed phase is 0.1 to 10 μm.

* * * * *